March 10, 1942.  R. BERINGER  2,275,718
SYNCHRONIZED LOW GEAR
Filed April 19, 1940  2 Sheets-Sheet 1

Inventor
Roscoe Beringer
By
Blackmore, Spencer & Flint
Attorneys

March 10, 1942.  R. BERINGER  2,275,718
SYNCHRONIZED LOW GEAR
Filed April 19, 1940  2 Sheets-Sheet 2

Inventor
Roscoe Beringer
By Blackmor, Spencer & Hint
Attorneys

Patented Mar. 10, 1942

2,275,718

UNITED STATES PATENT OFFICE 2,275,718

SYNCHRONIZED LOW GEAR

Roscoe Beringer, Detroit, Mich., assignor to General Motors Corporation, Detroit, Mich., a corporation of Delaware Application April 19, 1940, Serial No. 330,456

9 Claims. (Cl. 74—339)

This invention relates to variable speed power transmitting gearing and is particularly adapted to motor-vehicle gear-sets including both slidable intermeshable gears and constant-mesh selectively clutched gears.

The object is to facilitate meshing of a sliding gear pair such as the low or first speed gears of a motor-vehicle variable-speed transmission gearing.

The invention consists primarily of variable ratio power transmission gearing having both constantly meshed selectively clutched mainshaft and countershaft gears and slidably intermeshable main and countershaft gears; a friction clutch adapted to frictionally couple one of said constantly meshed gears to the shaft on which it is mounted, and means responsive to the approaching movement of said slidably intermeshable gears toward one another for actuating the friction clutch.

The invention further consists in certain subcombinations and parts as described in the specification and set forth in the claims.

In the drawings:

Fig. 1 illustrates a known type of three speed forward and reverse motor vehicle power transmission gear-set with the improvement of this invention added to it. A gear casing 10 is indicated as broken away to expose in full line drawing those parts to which this invention relates.

Figure 1:
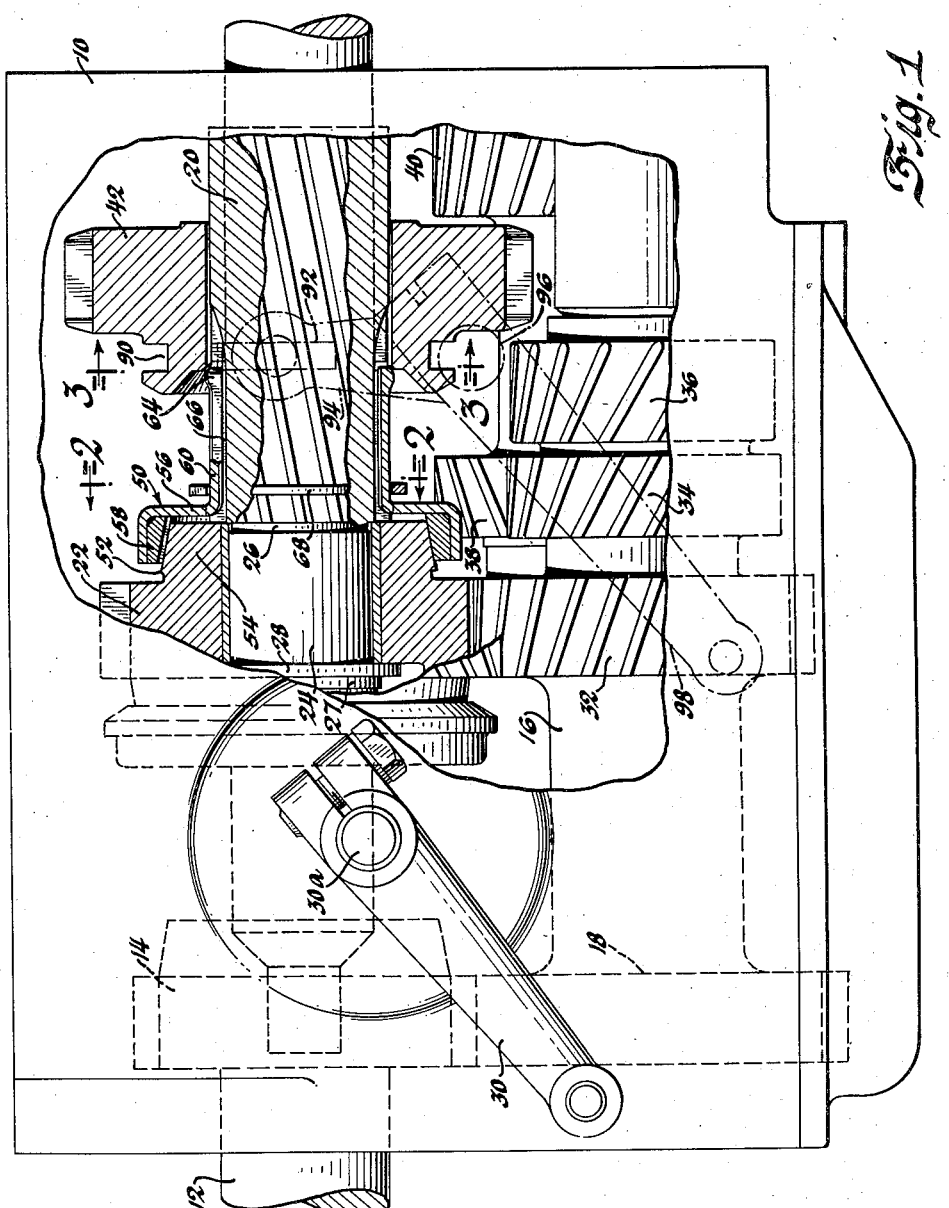
Fig. 1 is a side elevation of a variable speed power transmitting gear-set inclosed in a casing a part of which is represented as broken away to expose the combination of elements pertaining to this invention.

Numeral 12 indicates the usual main or engine-clutch shaft entering and supported by a bearing in the front end of the casing. Within the casing shaft 12 carries on its rear end gear 14. The front end of main driven shaft 20 is spigoted as usual in the rear end of clutch shaft 12, and its rearward end is supported in a bearing in the rear part of casing 10. The bearings (not shown) maintain shafts 12 and 20 as usual in axial alinement. Countershaft 16 is disposed with its axis parallel to shaft 20 by any suitable bearing means in casing 10 and supports fixedly-related gears 18, 32, 34 and 36, gear 18 being in constant mesh with clutch shaft gear 14. Shaft 12 is the primary driving shaft and countershaft 16 is a secondary driving shaft to drive shaft 20 when first, second, or reverse train is in gear.

Second speed gear 22 is mounted to be freely rotatable on a cylindrical bearing surface 24 of shaft 20, or to be locked to said shaft, as desired. Gear 22 is restrained from axial movement rearward by shoulder 26 on shaft 20 and from axial forward movement by snap ring 27 and washer 28.

Angular movement of the lever 30 and rock shaft 30a in one sense of rotation or the opposite operates synchronizing clutch mechanism of known construction to lock second speed gear 22 to main driven shaft 20 in order to obtain second speed or to lock shaft 20 to main clutch shaft 12 in order to obtain third speed. Lever 30 may be operated from a control device accessible to the operator's hand by any suitable intermediate connections not shown.

Gear 32 on the countershaft is in constant mesh with gear 22 and constitutes a power transmitting element in the second speed train whenever gear 22 is locked to shaft 20. Gear 34 is in constant mesh with gear 38 which is fixedly connected with gear 40, the two latter together constituting a reverse idler unit. Gear 42, slidably keyed on main driven shaft 20, may be meshed with gear 36 to complete first speed forward train, or with gear 40 of the reverse idler unit to complete the reverse driving train. The teeth of gears 36, 40 and 42 are preferably chamfered at their ends as usual to facilitate meshing.

The means for selectively coupling second and third speed gear trains constitute no part of the invention for which protection is sought through this application. Said means may for example be similar to that shown in Patent 2,060,971, granted Nov. 17, 1936, in the name of Roscoe Beringer. Nor is the control mechanism used in the gear set shown, and indicated partially only in the drawings, involved in this invention.

The invention sought to be protected herein comprises inertia-check friction and positive coupling means whereby clashing of gears 42 and 36 (the positive coupling means) may be avoided whenever an effort is made to connect primary drive shaft 12 with main driven shaft 20 through the first speed train, including gear 14 and countershaft gears 18 and 36, while parts of the variable speed gear set are rotating. In the herein disclosed embodiment of the invention a friction clutch is arranged to couple second speed gear to shaft 20 in response to an axially directed force exerted upon it by first speed gear 42 during its movement toward countershaft gear 36 for the purpose of meshing therewith and thus completing first speed train. By the action of known interlocking devices (not shown) for variable-speed gearing-control mechanism, first speed gears cannot be intermeshed until second and third speed trains are in their neutral positions. Hence second speed gear 22 is always unlocked from shaft 20 when conditions permit the operator to move first speed gear 42 toward its companion gear 36 on the countershaft for the purpose of transmitting power to the shaft 20 through the first speed train.

The friction clutch to be energized by forward axial movement of gear 42 may be of any suitable type. The one selected as satisfactory is a cone clutch 50 the external conical element 52 of which is a hub-like rearward projection 54 on gear 22. The internal conical element of clutch 50 is an axially movable ring 56, preferably composed of sheet material, such as wrought steel, of substantially right-angular cross section, within the internal angle of which is pressed, or otherwise snugly seated and secured, a ring 58 of bronze, or other suitable friction-clutch-surfacing substance, having an internal-conical surface adapted to coact with the external-conical surface 52 of cone 54. The friction surface of ring 58 is formed as usual with grooves for removing oil, and may have a taper of 9° with reference to the axis of gear 22 or such other angle as may be found to effect a satisfactory gradual seizure when the clutch is energized by force exerted by gear 42 when moving toward gear 36 to mesh therewith, and yet will readily release when the gear 42 is retracted to its neutral position.

Figure 2:
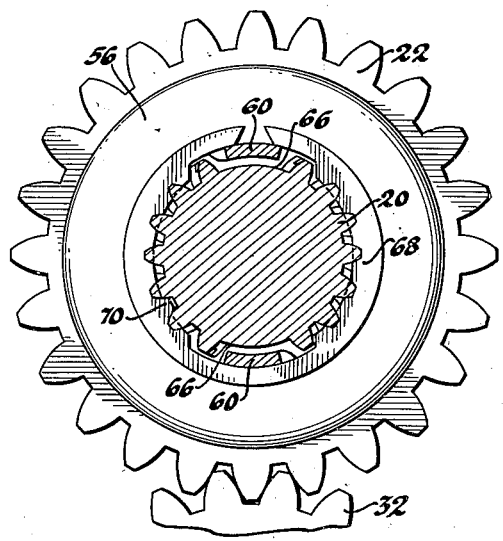
Fig. 2 represents a section taken on a transverse plane indicated by line 2—2 of Fig. 1, showing the mechanism as it appears looking in the direction indicated by the arrows but with reverse-gear idler removed.

In order that clutch ring 56 may readily yield to the force exerted by the forward movement of first speed gear 42, said ring 56 is equipped with one or more rearward-projecting, elastic force-reaction members 60, preferably two, disposed 180° apart as shown, each curved transversely corresponding substantially to the curvature of the ribbed portion of shaft 20, each having preferably substantially parallel edges, inclined detent or checking surfaces 62 on the corners and a convex boss formed on the outer side of the end as indicated at 64. Members 60 are preferably integral with ring 56, and lie in main driven shaft grooves 66, each of which is wider than a member 60 by an extent equal substantially to the axially projected widths of the two checking inclines 62. Grooves 66 may be formed by removal of two ribs or splines from shaft 20 for a distance a little greater than the length of members 60 as indicated in Fig. 1. The members 60 unite with clutch ring 56 at the edge of the circular opening therein. Each is preferably given an elastic set to cause it to diverge slightly from the common axis of clutch ring and shaft 20. They are spaced from the bottoms of grooves 66 as clearly indicated in the drawings and are confined by a split spring lock ring 68, as shown in Figs. 1 and 2. Ring 68 is seated in a circumferential groove formed in the crowns of the ribs or splines of shaft 20 adajacent the rear face of clutch ring 56. This groove prevents the lock ring from moving longitudinally and a tooth-like locking projection 70 entering between two ribs or splines on shaft 20 prevents rotational displacement with respect to the shaft; it is reduced in width at those portions that span the members 60 and grooves 66.

Figure 3:
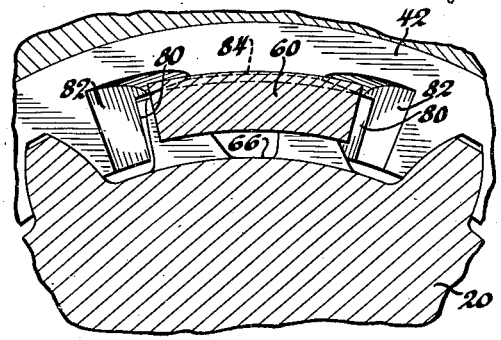
Fig. 3 is a section taken on the transverse plane indicated by line 3—3 of Fig. 1 showing the mechanism as it appears looking in the direction indicated by the arrows.
Figure 4:
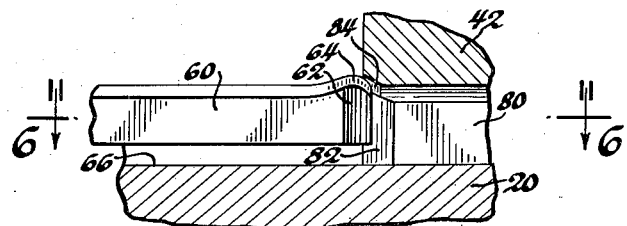
Fig. 4 is a longitudinal section through a fragment of the mechanism including parts of the front end of slidable first speed gear, the main driven shaft and a fore-and-aft trending force-reaction member of the axially movable element of the friction clutch.
Figures 5, 6:
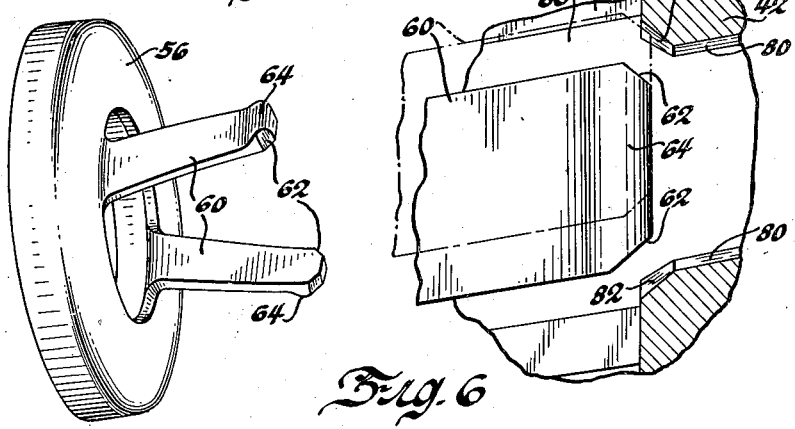
Fig. 5 is a perspective view of the axially movable friction clutch element involved in this invention.
Fig. 6 is a detail showing the disposition of inclined surfaces on the slidable first speed gear arranged to cooperate with companion formations on one element of the friction clutch.

In order to cooperate with the force reaction members 60 on friction clutch ring 56 the sliding gear 42, through which force is applied to members 60, is provided with two passageways, such as grooves or channels 80, in the illustrated embodiment, spaced 180° apart and of a width to receive the members 60 on the clutch ring 56 with an easy fit. The width of said grooves should be only sufficient to allow easy longitudinal movement of gear 42 with respect to said members after the latter have entered the grooves past the checking inclines at the front end corners to be described presently. Inspection of Fig. 3 reveals that each groove 80 has been formed by omitting or removing one rib entirely and machining or otherwise forming the opposing sides of the two ribs adjacent thereto to run parallel with the edges of member 60.

The depth of grooves 80 need be only that of the other grooves made in the bore of gear 42 to receive the ribs or splines of shaft 20 for smooth and even movement of the gear thereon. The front side-corners of grooves 80 are preferably rounded or beveled as at 82 to cooperate with the checking inclines 62 on members 60 in the event that the speeds of rotation of gear 22 and shaft 20 are not the same at the time effort is started to mesh gear 42 with gear 36. The front bottom corners of grooves 80 are also preferably rounded or beveled as at 84 in order that the bosses 64 on the out-sprung ends of members 60 will contact frictionally with said gear 42 as it moves forward and push the clutch ring 56 with sufficient force to cause the friction ring 58 to engage the mating friction surface of cone 54, and rotate clutch ring 56 with members 60 in one sense or the other according to the sense of differential rotation of gear 22 and shaft 20 and thus aline the appropriate checking inclines 62 and 82 in order to prime or cock the mechanism,—a condition precedent to causing the friction clutch to operate effectively in response to the intermeshing approach of the positive coupling members in inertia check couplings.

First speed gear 42 has the usual circumferential hub groove 90 engaged by a first-speed-and-reverse shifting yoke operated by mechanism mounted in the casing but not shown in Fig. 1 for the reason that the casing part that supports it is indicated as removed. The location, however, of so much of this mechanism as is required to shift gear 42 is indicated in dotted lines. The position of the shifter yoke is indicated at 92, the arm that carries it by 94, the rock shaft to which arm 94 is secured by numeral 96, and the operating lever secured to rock shaft 96 outside the casing by numeral 98. The lever 98 may be connected by suitable known power transmitting linkage or the like, not shown, to a control device convenient for the operator, as before stated with respect to the means for shifting to second or third. Interlocking means before mentioned but not shown prevents operation of lever 98 to shift gear 42 unless second and third speed gears are in neutral, and likewise prevents operation of lever 30 to couple second and third speed trains unless gear 42 is in neutral.

As the mechanism of this invention is contemplated for use in connection with a main or engine clutch, the operator in shifting from second to first while the vehicle is running first disengages the engine clutch and moves the operator's shifting device to neutral position. Main shaft 20 is then driven by the coasting vehicle, and main clutch shaft 12, countershaft gears, reverse idler and second speed gear 22 are kept turning only by inertia at rapidly decreasing velocity due to the frictional resistance of gear case oil and the rubbing contacts of bearings and gear teeth. When the operator manipulates his shifting device in the effort to connect input shaft 12 through the countershaft gears with output or main driven shaft 20 in first speed, lever 98 is moved counterclockwise (as viewed in Fig. 1) and first speed gear 42 is caused to slide forward (to the left as viewed in Fig. 1). The first increment of movement of gear 42 causes the front bottom corner 84 of each groove 80 in said gear to bear frictionally on the boss 64 at the end of each friction clutch member 60. As the gear 42 continues to advance, greater friction is developed between boss 64 on member 60 and bottom corner 84 of groove 80 owing to the elastic resistance of member 60 to inward displacement. The frictional contact thus established between gear 42, which cannot move angularly with respect to shaft 20, and friction clutch ring 56 and reaction member 60, which can move angularly a limited extent with respect to shaft 20, immediately causes a rotative movement of the friction ring 56 with respect to shaft 20 and gear 42 in one sense or the opposite, depending on whether the gear 22 rotates faster or slower than shaft 20, bringing the checking surfaces 62 on one side or the other into axial alinement with the corresponding corners of grooves 80 in gear 42. Continued advance of gear 42 then pushes friction clutch element 56 against its companion element 54 with sufficient force to cause the free cluster composed of shaft 12, gear 14, countershaft gears, reverse idler and gear 22, previously disconnected from engine and load, to rotate at the speed at which it rotates when positively connected to engine and load and transmitting power in second speed. Under this condition the teeth of gear 36 are moving somewhat faster than the teeth of gear 42 in the same sense of direction; therefore continued pressure upon the control device will cause gears 42 and 36 to mesh, since even if the chamfered teeth of said two gears should meet end to end the slow differential movement will immediately effect a relative displacement so that the teeth of one will readily slide into the tooth spaces of the other. The first speed train having been established and hence no axial force being exerted tending to press the friction surfaces of clutch 50 together they will be released by reason of the now differential speeds of shaft 20 and gear 22. When gear 42 is unmeshed and moved back to neutral the quantity of friction exerted between boss 64 on the end of each outward-biased elastic member 60 and the bottom of grooves 80 in rearward moving gear 42 together with the side friction will be sufficient to pull the friction clutch elements apart, should there be any rubbing contact, and restore to gear 22 complete freedom of rotation with respect to shaft 20, unhampered for a subsequent operation of establishing drive through the second speed train.

The foregoing describes the mode of operation of the invention, assuming a shift from second speed ratio to first becomes necessary during continuous driving. However, a more noticeable utility is realized under such conditions as exist for example in city-driving when the driver of a car so equipped is compelled to bring the car to a stop in an emergency, or at a street intersection. Under such circumstances the driver first releases the main clutch, applies the brake and comes to a stop, then shifts to neutral leaving the engine running. He may then choose to hold the clutch released and shift to first speed so as to be ready for a quick start by letting the clutch in as soon as the emergency has passed or the green lights go on; or he may choose to shift to neutral and let the main clutch reengage thus keeping the transmission gears rotating without load until the emergency has passed or the signal lights change to green, whereupon he again disengages the main clutch and couples the low speed train. Under either assumed condition the main drive shaft to which first speed gear 42 is keyed is stationary, while the cluster consisting of second speed gear, countershaft gears, main clutch shaft gear, main clutch shaft and driven clutch member, may be rotating under the influence of inertia at considerable velocity. Now when gear 42 is moved forward to couple the transmission in first speed, the friction clutch is immediately engaged and acts as a brake on the spinning cluster, thus decreasing the speed of rotation of the cluster so that the teeth of slidable gear 42 may be readily intermeshed with the teeth of gear 34 on the countershaft. The car may be thus started quickly from rest when the driver wishes with the result of saving the time of himself and others and increasing traffic safety.

Having now described and illustrated my invention in the embodiment now preferred by me and explained its mode of operation,

I claim:

1. In variable ratio power transmitting gearing, the combination of two parallel shafts carrying constantly meshing gears, one of which is capable of free rotation with respect to the shaft on which it is mounted; means for selectively locking said latter mentioned gear to its shaft; a gear slidably keyed on the shaft on which the freely rotatable gear is mounted, and a companion gear fixed on the other shaft with which the slidably keyed gear may intermesh when moved axially toward the freely rotatable gear; a friction clutch for frictionally coupling said freely rotatable gear to its shaft; means on said friction clutch reacting to an axial force applied to the slidably keyed gear for causing said friction clutch to seize prior to intermeshing of said slidable gear with its companion, said means for selective locking being independent of said clutch for frictionally coupling.

2. In variable ratio power transmitting gearing the combination of a driving and a driven shaft in parallel arrangement; a pair of constantly meshing gears on said shafts, that on the driven shaft being capable of rotation with respect thereto; means for selectively locking the rotatable gear to the driven shaft; a gear slidably keyed to the driven shaft and a companion gear fixed on the driving shaft arranged to intermesh with the slidably keyed gear when the latter is moved toward said gear that is capable of rotation with respect to the driven shaft; a friction clutch for frictionally coupling to the driven shaft said gear capable of rotation with respect thereto; cooperating means on said slidably keyed gear and said friction clutch for causing engagement of the friction clutch in response to the approaching movement of the slidably keyed gear toward its companion on the driving shaft, said means for selective locking being independent of said clutch for frictionally coupling.

3. In variable ratio power transmitting gearing the combination of a main driven shaft and a parallel countershaft; a gear on the main driven shaft capable of rotating freely thereon and a gear fixed to the countershaft in constant mesh with said gear on the driven shaft; means for selectively locking said freely rotatable gear to said driven shaft to complete one train of gearing; a pair of intermeshable gears, one of which is fixed to the countershaft and the other slidably keyed to the driven shaft, said gears when intermeshed completing a train of gearing of lower ratio than that completed by the selective locking of said freely rotatable gear to the driven shaft; a friction clutch for frictionally coupling the freely rotatable gear to the main driven shaft; cooperating means on said slidably keyed gear and said friction clutch for causing said friction clutch to engage in response to the approaching movement of the slidably keyed gear toward its companion on the countershaft.

4. In an inertia check composite coupling, the combination of axially movable frictional and toothed intermeshable gear elements mutually provided with inertia-check detent devices and frictional priming means, said detent devices and priming means comprising a resilient force-reaction member having a lost motion driving connection with respect to the axially movable toothed gear element, and said member having a bias toward a position in which it engages frictionally with said axially movable toothed element as the latter advances toward intermeshing position.

5. The combination of shafting, slidably intermeshable toothed power transmitting elements and a friction coupling thereon, said friction coupling consisting of two elements one of which is movable into and out of frictional engagement with the other; means for causing the movable friction coupling element to engage its companion, said means comprising a force-reaction member connected to the friction coupling element and having a lost motion positive driving connection with respect to the slidable toothed element; the latter having a passageway for receiving said force reaction member; cooperating inertia check devices on said member and in said passageway, said member having an elastic bias to cause frictional resistance within the passageway between the member and the slidable toothed element.

6. A combination as defined in claim 5 in which the inertia checking devices comprise inclined surfaces on the edge of the force-reaction member and one side of said passageway in the slidable toothed element.

7. A combination as defined in claim 5 in which the end of the force reaction member is provided with a friction boss on the side toward which the member is biased.

8. A combination as defined in claim 5 in which the passageway in the slidable toothed element consists of a channel formed in the bore thereof and opening into a corresponding wider channel in the shaft on which said toothed element slides, the bottom corner of said channel being chamfered for engaging the end of said force reaction member which is elastically biased away from the axis of the toothed slidable member.

9. In variable ratio power transmitting gearing, the combination of shafting, a first axially movable element splined to the shafting and a frictional coupling comprising a second movable element; said first movable element having a channel in opposed relation to a wider channel in the shafting on which said first element is slidable, said channel having chamfered side and bottom corners at the advancing end; the second movable element comprising an elastic member extending longitudinally toward the first movable element parallel with the sides of said channel; said member having a width less than that of the channel in the shafting and approximately equal to that of the channel in the first slidable element but such as to permit it freely to enter said channel; the end of said member having an elastic bias away from the axis of said first slidable element and having chamfered corners thereon adapted to cooperate with the chamfered corners of the channel in the axially movable first element during the initial movement thereof toward its companion element.

ROSCOE BERINGER.

DISCLAIMER 2,275,718.—*Roscoe Beringer*, Detroit, Mich. SYNCHRONIZED LOW GEAR. Patent dated March 10, 1942. Disclaimer filed August 13, 1943, by the inventor; the assignee, *General Motors Corporation*, assenting.

Hereby enters this disclaimer to claims 1, 2, and 3 in said specification.

[*Official Gazette September 21, 1943.*]